(12) United States Patent
Hsu

(10) Patent No.: US 11,837,941 B2
(45) Date of Patent: Dec. 5, 2023

(54) MOTOR DEVICE WITH INTEGRATED CONNECTION ASSEMBLY

(71) Applicant: Delta Electronics, Inc., Taoyuan (TW)

(72) Inventor: Fu-Mei Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 389 days.

(21) Appl. No.: 17/229,401

(22) Filed: Apr. 13, 2021

(65) Prior Publication Data

US 2022/0021268 A1     Jan. 20, 2022

(30) Foreign Application Priority Data

Jul. 16, 2020   (CN) .......................... 202021400968.0

(51) Int. Cl.
*H02K 5/22*        (2006.01)
*H02K 7/102*       (2006.01)
(Continued)

(52) U.S. Cl.
CPC ......... *H02K 5/225* (2013.01); *H01R 13/5219* (2013.01); *H02K 7/102* (2013.01);
(Continued)

(58) Field of Classification Search
CPC .......... H02K 5/22; H02K 5/225; H02K 11/21; H02K 11/215; H02K 11/22; H02K 11/225; H01R 13/52; H01R 13/5219
See application file for complete search history.

(56) References Cited

U.S. PATENT DOCUMENTS 6,861,775 B2    3/2005   Lau
10,536,047 B2   1/2020   Becerra et al.
(Continued)

FOREIGN PATENT DOCUMENTS

CN      202075594 U       12/2011
JP      2014230464 A  *   12/2014
(Continued)

OTHER PUBLICATIONS

Okuma, Machine Translation of WO2019215816, Nov. 2019 (Year: 2019).*
(Continued)

*Primary Examiner* — Eric Johnson
(74) *Attorney, Agent, or Firm* — KIRTON McCONKIE; Evan R. Witt

(57) ABSTRACT

The disclosure relates to a motor device including a bracket, a connection assembly, a sensor, a stator and a rotor. The bracket includes a first end, a second end, a communication aperture and a slot. The communication aperture passes through the first end and the second end. The slot is disposed at the first end. The connection assembly is disposed in the slot and includes a first connector and a second connector. The second connector is inserted into an accommodation opening of the first connector. The sensor is disposed at the first end and includes a first circuit board connected to the first connector through a first connection element. The stator is connected to the second end and includes a second circuit board connected to the second connector through the second connection element. An end portion of the rotor passes through the communication aperture and spatially corresponds to the sensor.

12 Claims, 13 Drawing Sheets

(51) Int. Cl.
*H02K 11/21* (2016.01)
*H01R 13/52* (2006.01)
*H02K 5/10* (2006.01)

(52) U.S. Cl.
CPC .............. *H02K 11/21* (2016.01); *H02K 5/10* (2013.01); *H02K 2211/03* (2013.01)

(56) References Cited

U.S. PATENT DOCUMENTS

| | | | |
|---|---|---|---|
| 2016/0065031 A1* | 3/2016 | Yamada | H02K 5/225 310/71 |
| 2020/0036265 A1 | 1/2020 | Goatley et al. | |
| 2020/0348050 A1* | 11/2020 | Kim | H02K 5/24 |

FOREIGN PATENT DOCUMENTS

| | | | | |
|---|---|---|---|---|
| TW | M471102 U | 1/2014 | | |
| TW | I543496 B | 7/2016 | | |
| WO | WO-2019215816 A1 * | 11/2019 | ......... | G01D 5/24433 |
| WO | WO-2020121529 A1 * | 6/2020 | ............. | H02K 11/22 |

OTHER PUBLICATIONS

Yoshizawa, Machine Translation of JP2014230464, Dec. 2014 (Year: 2014).*
Tanaka, Machine Translation of WO2020121529, Jun. 2020 (Year: 2020).*

\* cited by examiner

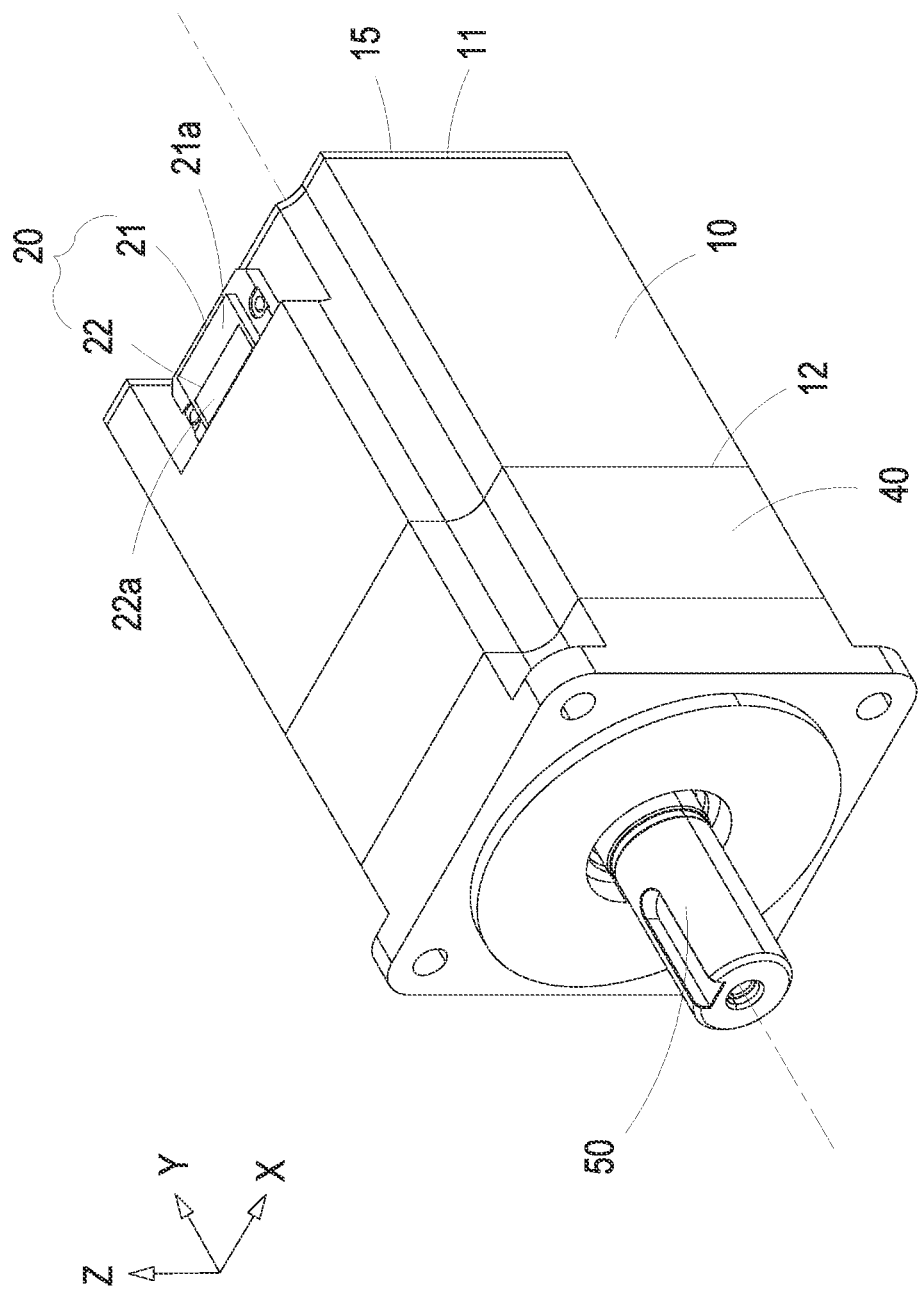

MOTOR DEVICE WITH INTEGRATED CONNECTION ASSEMBLY

FIELD OF THE INVENTION

The present disclosure relates to a motor device, and more particularly to a motor device having a bracket integrally formed with a connection assembly.

BACKGROUND OF THE INVENTION

A conventional motor device includes at least two kinds of wires that need to be processed. For example, a motor includes a power wire, a brake wire and a signal wire disposed therein and needed to be processed. However, the connection of such wires needs to be processed manually, and it is difficult to realize an automatic production.

In addition, the connection of such wires is also combined with a connector for external connection. For some motor devices used in a special environment, a sealing structure must be provided, so as to prevent the internal electronic components from being contaminated. However, when different kinds of wires are connected through different connectors, a risk of sealing failure is increased. For example, when the power wire and the signal wire of the motor are externally connected through two connectors, two sealing structures must be formed at the outlet of the power wire and the outlet of the signal wire, respectively. Therefore, more labor is required for processing the two sealing structures disposed at two outlets, and it also means that there are two risks of sealing failures in the overall motor device. On the other hand, when the power wire and the signal wire are connected to the connectors, it is more likely to cause interference between the power wire and the signal wire, and affect the accuracy of signal transmission.

Therefore, there is a need of providing a motor device having a bracket integrally formed with a connection assembly, to overcome the above drawbacks.

SUMMARY OF THE INVENTION

An object of the present disclosure is to provide a motor device. By integrating the connection assembly with the bracket, at least two kinds of wires in the motor device are externally connected together through the connection assembly, and one single sealing component is used to achieve the sealing performance of the connection assembly and reduce the risk of sealing failure. On the other hand, the connection assembly having the at least two kinds of wires combined thereon is further integrated with the bracket to form a modular structure. It is beneficial to realize the automatic production of the motor device.

Another object of the present disclosure is to provide a motor device. By using the bracket integrated with the connection assembly, a sensor, a rotor and a stator of the motor device are connected. For example, the connection assembly is formed by assembling a first connector and a second connector. The first connector is electrically connected to the sensor through a signal connection terminal, and the second connector is electrically connected to a circuit board of the stator through a power wire passing through the bracket. The signal connection terminal is formed between the first connector and the sensor, so that a shorter and stable structure is formed for an electrical connection. The power wire passing through the bracket is connected to the second connector, and the second connector is further inserted into an accommodation opening of the first connector to realize the external connection together. In this way, the signal connection terminal and the power wire of the motor device can be externally connected through the connection assembly. Moreover, when the signal connection terminal is electrically connected to the first connector, it is not interfered by the power wire connected to the second connector. It is beneficial to ensure the accuracy of signal transmission. In addition, the power wire passing through the bracket can be electrically connected to the circuit board of the stator through a terminal assembly to form a modular structure. It is beneficial to realize the automatic production of the motor device.

A further object of the present disclosure is to provide a motor device. By embedding a brake assembly in the bracket having the connection assembly integrated thereon, a modular structure is formed. It facilitates the motor device to achieve the automatic production and ensure the accuracy of signal transmission, which is not interfered by a brake wire.

According to an aspect of the present disclosure, there is a motor device. The motor device includes a bracket, a connection assembly, a sensor, a stator and a rotor. The bracket includes a first end, a second end, a communication aperture and a slot. The first end and the second end are opposite to each other. The communication aperture passes through the first end and the second end. The slot is disposed at the first end. The connection assembly includes a first connector and a second connector disposed adjacent to each other. The first connector is disposed in the slot. The first connector includes an accommodation opening, and the second connector is inserted into the accommodation opening. The first connector includes a first connection element and the second connector includes a second connection element. The sensor is disposed at the first end of the bracket and includes a first circuit board electrically connected to the first connector through the first connection element. The stator is connected to the second end of the bracket. The stator includes a second circuit board. The second connection element passes through the bracket. The second circuit board is electrically connected to the second connector through the second connection element. The rotor passes through the stator. An end portion of the rotor passes through the communication aperture of the bracket. The end portion of the rotor spatially corresponds to the sensor.

In an embodiment, the motor device further includes a sealing component, wherein the sealing component spatially corresponds to the connection assembly and covers the connection assembly.

In an embodiment, the first connector includes a first external connection surface and a first internal connection surface, and the first external connection surface and the first internal connection surface are opposite to each other, wherein the first external connection surface is exposed from the slot, and the first connection element is connected to the first circuit board from the first internal connection surface, wherein the second connector includes a second external connection surface and a second internal connection surface, and the second external connection surface and the second internal connection surface are opposite to the each other, wherein the second external connection surface is a portion of the second connector exposed from the accommodation opening, and the second connection element is connected to the second circuit board from the second internal connection surface.

In an embodiment, the first internal connection surface spatially corresponds to the first circuit board. The first connection element is connected between the first internal connection surface and the first circuit board, and the first connection element and the second internal connection surface are misaligned with each other.

In an embodiment, the second connection element is connected between the second internal connection surface and the second circuit board, and the second connection element and the first internal connection surface are misaligned with each other.

In an embodiment, a distance between the first external connection surface and the first internal connection surface is greater than a distance between the second external connection surface and the second internal connection surface.

In an embodiment, the first circuit board is disposed on a surface of the sensor and outwardly projected from the surface, wherein the first circuit board is extended toward the first connection element, wherein the first connection element is a connection terminal, wherein the connection terminal is an L-shaped connection terminal.

In an embodiment, the first connection element is a signal connection terminal, and the second connection element is a power wire.

In an embodiment, the bracket includes a recessed portion located at the first end of the bracket and recessed inwardly from an outer peripheral edge of the bracket, wherein the slot is disposed on a bottom surface of the recessed portion.

In an embodiment, the motor device further includes a sealing component, wherein the sealing component spatially corresponds to the recessed portion and covers the connection assembly.

In an embodiment, the second connection element is a conductive wire passing through the bracket.

In an embodiment, the bracket includes a terminal assembly disposed at the second end, and the terminal assembly includes a carrying board and at least one connection terminal, wherein the at least one connection terminal is disposed on the carrying board, and the carrying board is fixed at the second end, wherein the second connection element is electrically connected to the second circuit board of the stator through the at least one connection terminal.

In an embodiment, the motor device further includes a brake assembly embedded in the bracket and aligned with the communication aperture of the bracket, wherein the brake assembly includes a third connection element electrically connected to the second connector, wherein the end portion of the rotor passes through the brake assembly and the communication aperture of the bracket, wherein the end portion of the rotor spatially corresponds to the sensor.

In an embodiment, the third connection element is a brake wire.

The above objects and advantages of the present disclosure become more readily apparent to those ordinarily skilled in the art after reviewing the following detailed description and accompanying drawings, in which:

BRIEF DESCRIPTION OF THE DRAWINGS

FIG. 8 shows a perspective view of a motor device according to a third embodiment of the present disclosure;

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only; it is not intended to be exhaustive or to be limited to the precise form disclosed.

Figure 1:
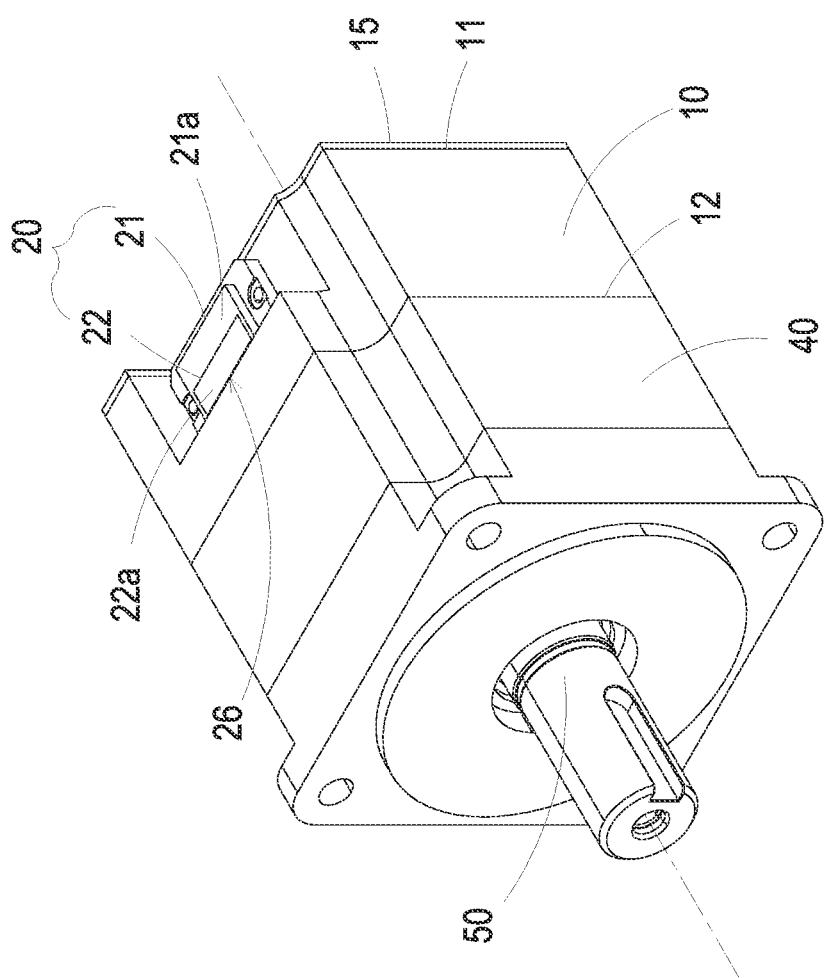
FIG. 1 shows a perspective view of a motor device according to a first embodiment of the present disclosure.
Figure 2:
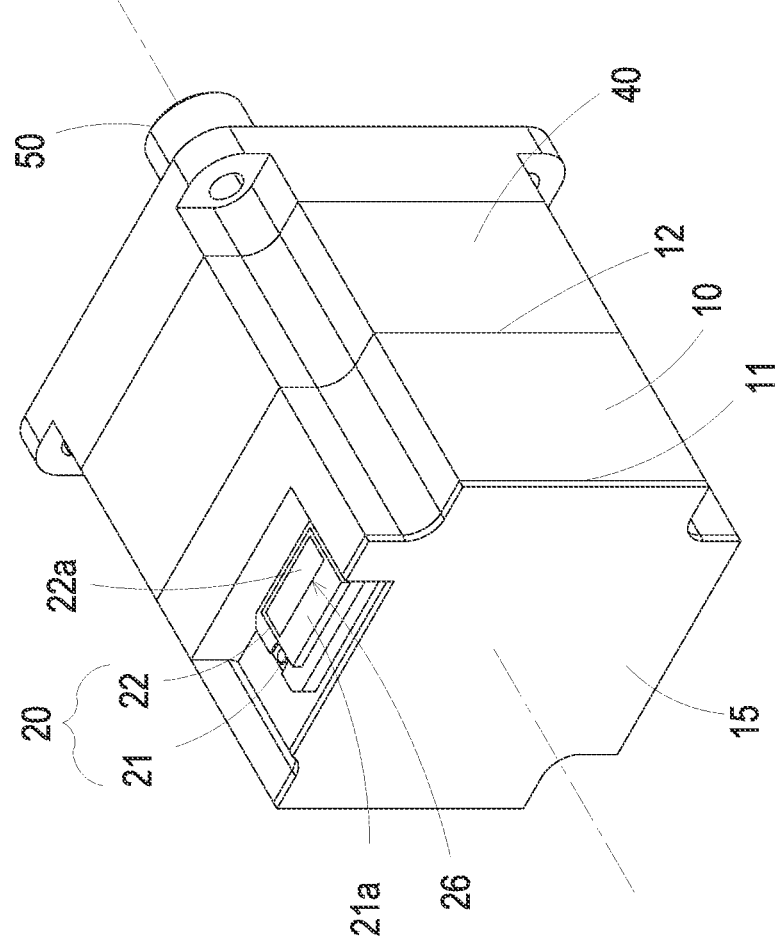
FIG. 2 shows a perspective view of the motor device according to the first embodiment of the present disclosure and taken from another perspective.
Figure 3:
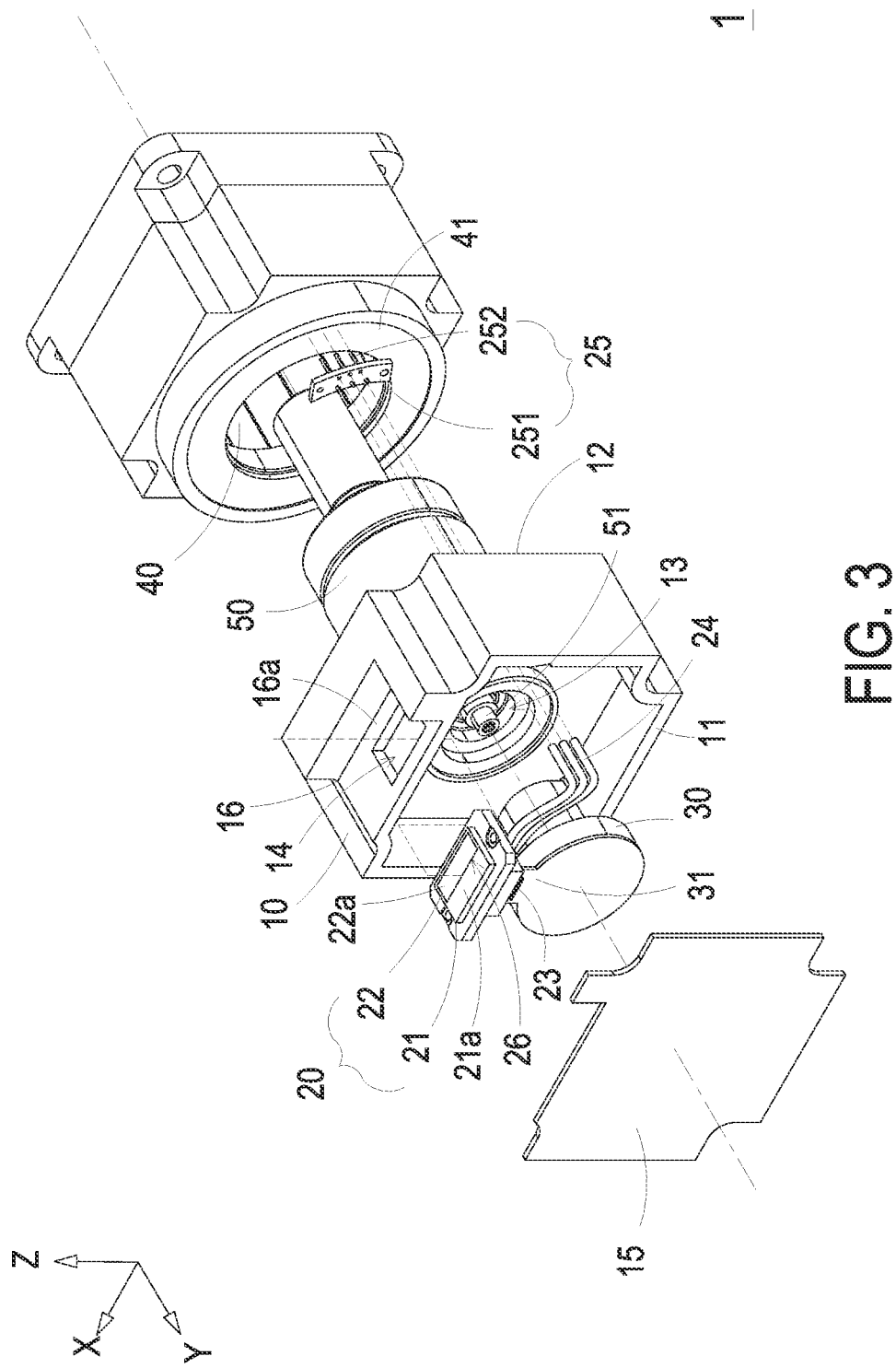
FIG. 3 shows an exploded view of the motor device according to the first embodiment of the present disclosure.
Figure 4:
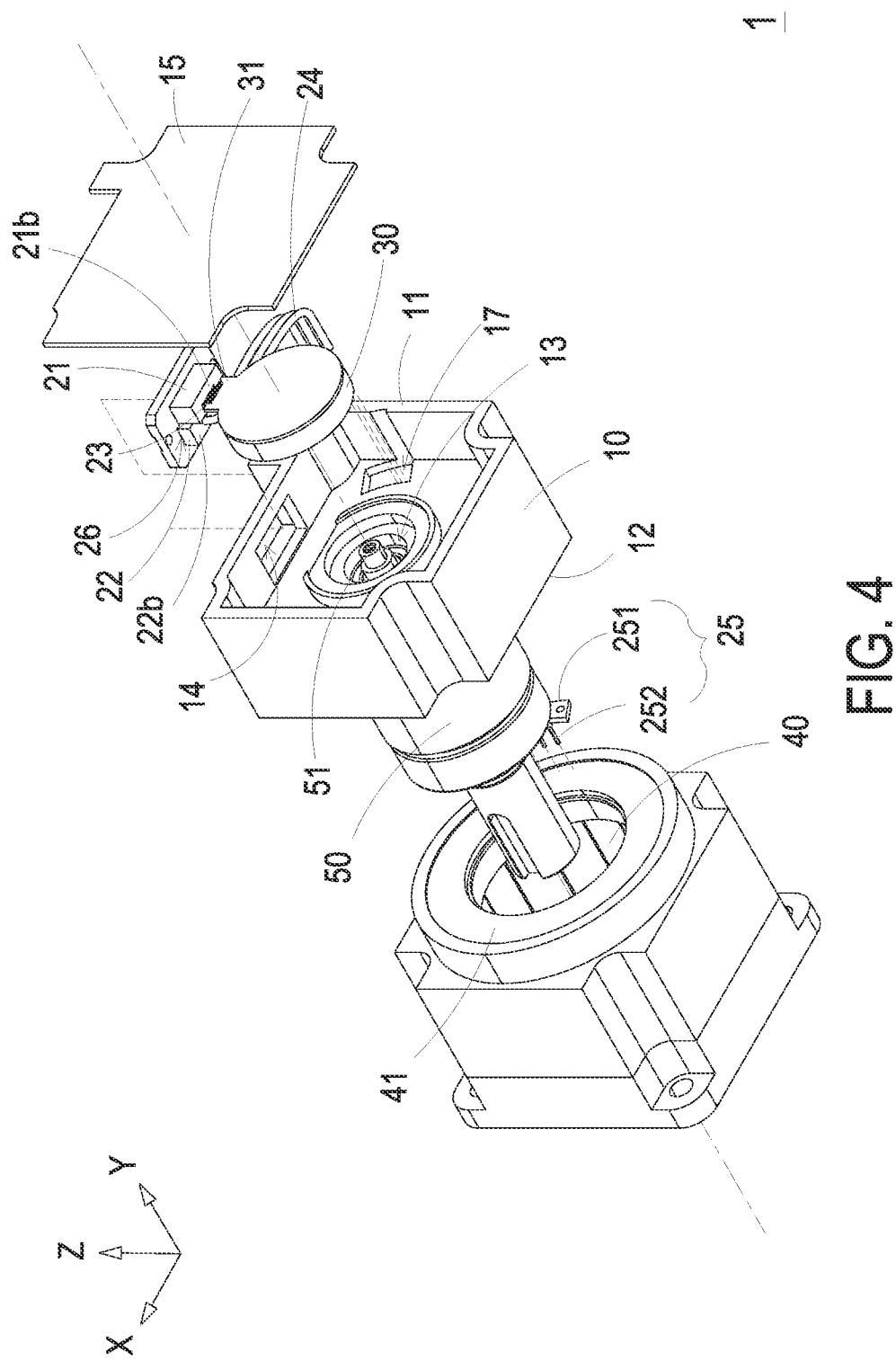
FIG. 4 shows an exploded view of the motor device according to the first embodiment of the present disclosure and taken from another perspective.
Figure 5:
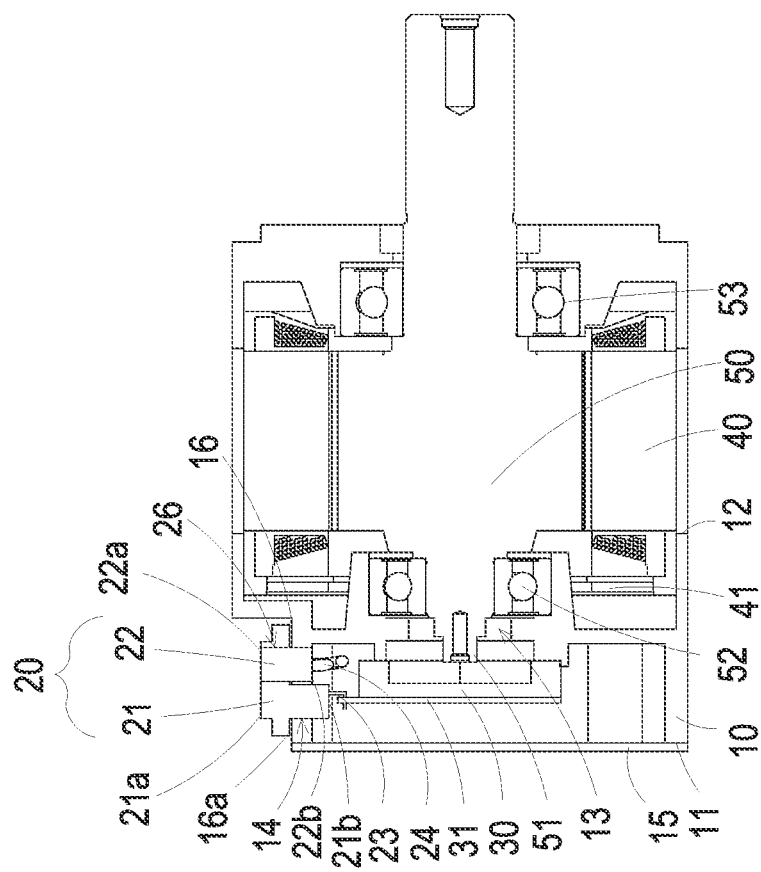
FIG. 5 shows a cross-sectional view of the motor device according to the first embodiment of the present disclosure.

FIG. 1 and FIG. 2 show a perspective view of a motor device according to a first embodiment of the present disclosure. FIG. 3 and FIG. 4 show an exploded view of the motor device according to the first embodiment of the present disclosure. FIG. 5 shows a cross-sectional view of the motor device according to the first embodiment of the present disclosure. In the embodiment, the motor device 1 includes a bracket 10, a connection assembly 20, a sensor 30, a stator 40 and a rotor 50. The bracket 10 includes a first end 11, a second end 12, a communication aperture 13 and a slot 14. The first end 11 and the second end 12 are opposite to each other. The communication aperture 13 passes through the first end 11 and the second end 12. The slot 14 is disposed at the first end 11. In the embodiment, the connection assembly 20 includes a first connector 21 and a second connector 22. Preferably but not exclusively, the first connector 21 passes through the slot 14 or is embedded in the slot 14, so that a portion of the first connector 21 is exposed from the slot 14. In the embodiment, the first connector 21 includes an accommodation opening 26, and the second connector 22 is inserted into the accommodation opening 26 of the first connector 21, so that a portion of the second connector 22 is exposed from the accommodation opening 26 of the first connector 21. Preferably but not exclusively, in the embodiment, the bracket 10 further includes a recessed portion 16 located at the first end 11 of the bracket 10, and recessed inwardly from an outer peripheral edge of the bracket 10. The slot 14 is disposed on a bottom surface 16a of the recessed portion 16. In the embodiment, the first connector 21 includes a first connection element 23 and the second connector 22 includes a second connection element 24. The sensor 30 is disposed at the first end 11 of the bracket 10 and includes a first circuit board 31 electrically connected to the first connector 21 through the first connection element 23. The motor device 1 further includes a cover 15 disposed at the first end 11 of the bracket 10 and configured to cover and seal the first circuit board 31 of the sensor 30. In the embodiment, the stator 40 is connected to the second end 12 of the bracket 10. Preferably but not exclusively, the stator 40 includes a second circuit board 41. The second connection element 24 passes through a channel 17 of the bracket 10. The second circuit board 41 is electrically connected to the second connector 22 through the second connection element 24. In the embodiment, the rotor 50 passes through the stator 40 and includes an end portion 51. Preferably but not exclusively, the end portion 51 of the rotor 50 passes through the communication aperture 13 of the bracket 10. The end portion 51 of the rotor 50 spatially corresponds to the sensor 30. Preferably but not exclusively, in the embodiment, the rotor 50 is connected to the bracket 10 through the first bearing 52 and connected to the stator 40 through the second bearing 53, respectively. The present disclosure is not limited thereto.

In the embodiment, the first connector 21 includes a first external connection surface 21a and a first internal connection surface 21b, the first external connection surface 21a and the first internal connection surface 21b are opposite to each other. In the embodiment, the first external connection surface 21a is exposed from the slot 14. The first connection element 23 is connected to the first circuit board 31 of the sensor 30 from the first internal connection surface 21b. In the embodiment, the second connector 22 includes a second external connection surface 22a and a second internal connection surface 22b, and the second external connection surface 22a and the second internal connection surface 22b are opposite to the each other. In the embodiment, the second external connection surface 22a is a portion of the second connector 22 exposed from the accommodation opening 26. The second connection element 24 is connected to the second circuit board 41 of the stator 40 from the second internal connection surface 22b. In the embodiment, the first external connection surface 21a of the first connector 21 and the second external connection surface 22a of the second connector 22 are coplanar, so as to form an integral external connection surface of the connection assembly 20. It facilitates the motor device 1 to achieve the external connection and reduce the risk of sealing failure.

In the embodiment, the first internal connection surface 21a of the first connector 21 spatially corresponds to the first circuit board 31 of the sensor 30. The first connection element 23 is connected between the first internal connection surface 21b and the first circuit board 31 of the sensor 30. Moreover, the first connection element 23 and the second internal connection surface 22b of the second connector 22 are misaligned with each other and disjoint. In addition, the second connection element 24 of the second connector 22 is connected between the second internal connection surface 22b and the second circuit board 41 of the stator 40. The second connection element 24 and the first internal connection surface 21b of the first connector 21 are misaligned with each other and disjoint. Thus, the first connection element 23 and the second connection element 24 are designed as an individual conductive connection, respectively, so as to avoid the mutual interference therebetween.

In the embodiment, the first connection element 23 is a connection terminal. Preferably but not exclusively, the connection terminal is an L-shaped connection terminal. In the embodiment, the second connection element 24 is a conductive wire. Preferably but not exclusively, the first connection element 23 is electrically connected between the first connector 21 and the first circuit board 31 of the sensor 30, and the first connection element 23 is a signal connection terminal. In the embodiment, the second connection element 24 passes through the bracket 10 through for example but not limited to the channel 17, and is electrically connected between the second connector 22 and the second circuit board 41 of the stator 40. Preferably but not exclusively, the second connection element 24 is a power wire. In the embodiment, the first internal connection surface 21b of the first connector 21 spatially corresponds to the first circuit board 31 of the sensor 30, and is conducted through the first connection element 23, such as the L-shaped connection terminal, so that a shorter and stable structure is formed for an electrical connection between the first connector 21 and the first circuit board 31 of the sensor 30. It is beneficial to ensure the accuracy of signal transmission. In addition, the second connection element 24 and the first internal connection surface 21b are misaligned with each other and disjoint. Preferably but not exclusively, when the second connection element 24 such as a conductive wire passes through the bracket 10 through the channel 17 and is electrically connected between the second connector 22 and the second circuit board 41 of the stator 40, the second connection element 24 is led from the second internal connection surface 22b of the second connector 22 and spaced apart from the first connection element 23 such as the L-shaped connection terminal. On the other hand, the first external connection surface 21a of the first connector 21 and the second external connection surface 22a of the second connector 22 are combined to form the integral external connection surface of the connection assembly 20. Thus, the first connection element 23 served as the signal connection terminal of the motor device 1 and the second connection element 24 served as the power wire of the motor device 1 can are integrally formed to realize the external connection through the connection assembly 20. Moreover, when the signal connection terminal is electrically connected to the first connector 21, the interface caused by the power wire connected to the second connector 22 is avoided. It is beneficial to ensure the accuracy of signal transmission.

In the embodiment, the bracket 10 further includes a terminal assembly disposed at the second end 12 of the bracket 10. The terminal assembly 25 includes a carrying board 251 and at least one connection terminal 252. The at least one connection terminal 252 is disposed on the carrying board 251, and the carrying board 251 is fixed at the second end 12 of the bracket 10. In the embodiment, the second connection element 24 such as a conductive wire is led from the first end 11 of the bracket 10 to the second end 12 of the bracket 10, and electrically connected to the second circuit board 41 of the stator 40 through the at least one connection terminal 252, so as to achieve the electrical connection between the second connector 22 and the second circuit board 41 of the stator 40. Thus, the second connector 22, the second connector 24 and the terminal assembly 25 are pre-formed on the bracket 10 to form a modular structure. When the stator 40 is assembled with the bracket 10, the at least one connection terminal 252 of the terminal assembly 25 abuts or punctures a conductive portion (not shown) on the second circuit board 41, so as to achieve the electrical connection between the second connector 22 and the second circuit board 41 of the stator 40. Certainly, the present disclosure is not limited thereto.

Figure 6:
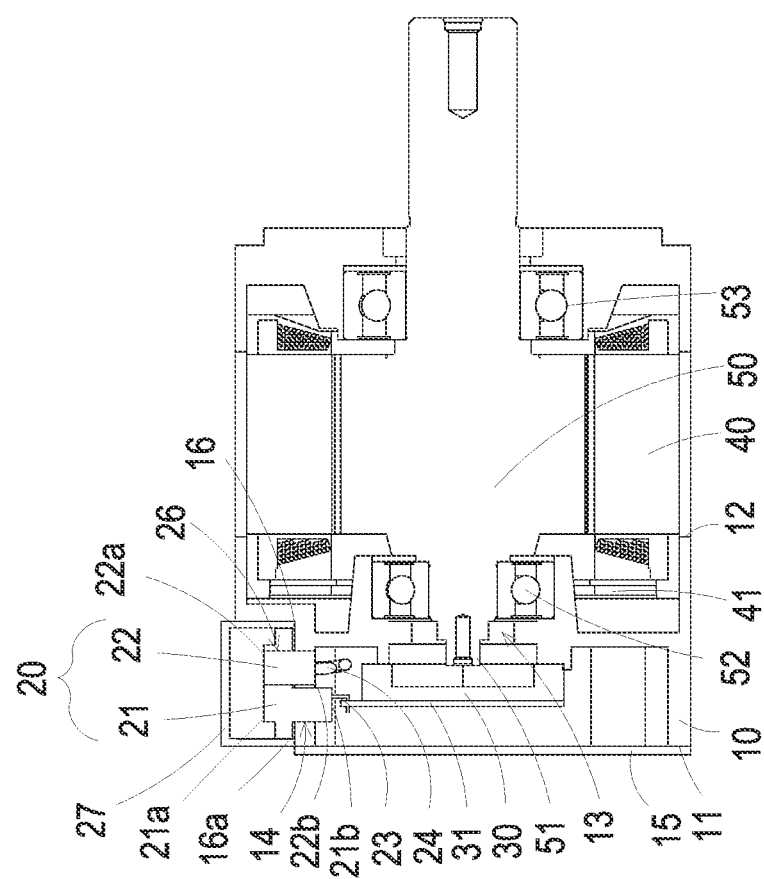
FIG. 6 shows a cross-sectional view of a motor device according to a second embodiment of the present disclosure.

FIG. 6 shows a cross-sectional view of a motor device according to a second embodiment of the present disclosure. In the embodiment, the structures, elements and functions of the motor device 1a are similar to those of the motor device 1 in FIGS. 1 to 5. The elements and features indicated by the numerals similar to those of the first embodiment mean similar elements and features, and are not redundantly described herein. In the embodiment, the motor device 1a further includes a sealing component 27. The sealing component 27 spatially corresponds to the connection assembly 20 disposed on the bottom surface 16a of the recessed portion 16, and covers the connection assembly 20. Preferably but not exclusively, in other embodiments, the sealing component 27 is a sealing kit, directly covering and sealing the first external connection surface 21a and the second external connection surface 22a of the connection assembly 20. The present disclosure is not limited thereto. In the embodiment, the first circuit board 31 of the sensor 30 and the second circuit board 41 of the stator 40 of the motor device 1a are externally connected together through the connection assembly 20, and one single sealing component 27 is used to achieve the sealing performance of the connection assembly 20. It facilitates the motor device 1a to reduce the risk of sealing failure.

Figure 7B:
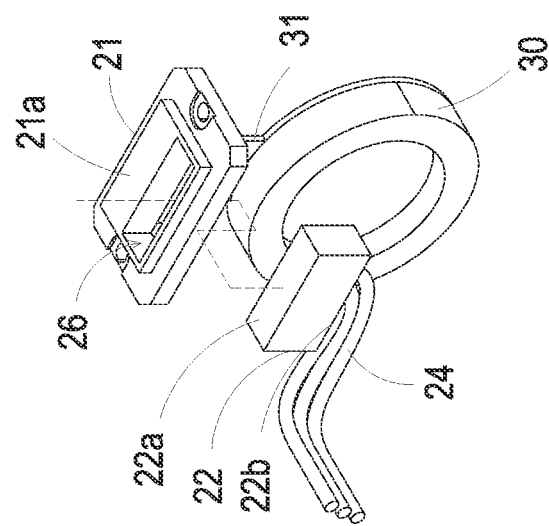
FIG. 7A and FIG. 7B are an exemplary structure showing the connection assembly of the present disclosure.
Figure 7A:
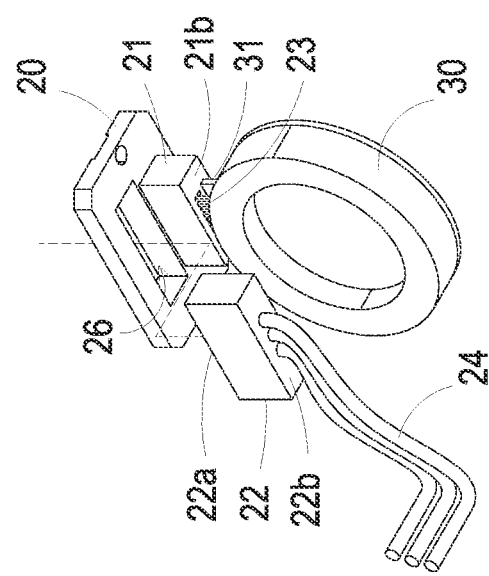

In the embodiment, the connection assembly 20 is formed by assembling the first connector 21 and the second connector 22. FIG. 7A and FIG. 7B are an exemplary structure showing the connection assembly of the present disclosure. In the embodiment, the first connector 21 includes an accommodation opening 26. The second connector 22 is inserted into the accommodation opening 26. Moreover, the first external connection surface 21a of the first connector 21 and the second external connection surface 22a of the second connector 22 are disposed adjacent to each other. Preferably but not exclusively, the first connection element 23 is an L-shaped connection terminal, so that a shorter and stable structure is formed for an electrical connection between the first connector 21 and the first circuit board 31 of the sensor 30. Preferably but not exclusively, the second connection element 24 is a conductive wire, which is connected to the second internal connection surface 22b of the second connector 22 firstly, and then the second connector 22 is inserted into the accommodation opening 26 of the first connector 21. Thus, the first external connection surface 21a of the first connector 21 and the second external connection surface 22a of the second connector 22 are coplanar and form an integral external connection surface. It facilitates the motor device 1 or the motor device 1a to achieve the external connection and reduce the risk of sealing failure. Moreover, in the embodiment, a distance between the first external connection surface 21a and the first internal connection surface 21b of the first connector 21 are greater than a distance between the second external connection surface 22a and the second internal connection surface 22b of the second connector 22. When the first connection element 23 is connected to the first internal connection surface 21b of the first connector 21 and the second connection element 24 is connected to the second internal connection surface 22b, the first connection element 23 and the second internal connection surface 22b of the second connector 22 are misaligned with each other and disjoint. Moreover, the second connection element 24 and the first internal connection surface 21b of the first connector 21 are misaligned with each other and disjoint. Thus, an individual conduction design for the first connection element 23 and the second connection element 24 is achieved, respectively, and it avoids the mutual interference between the first connection element 23 and the second connection element 24.

On the other hand, in order to facilitate the first connection element 23 such as an L-shaped connection terminal to form a shorter and stable structure for the electrical connection between the first connector 21 and the first circuit board 31 of the sensor 30, the first circuit board 31 disposed on the surface of the sensor 30 is further extended outwardly from the surface and toward the first connection element 23 or the first internal connection surface 21b of the first connector 21. In this way, it is more helpful to form a shorter and stable electrical connection between the first connector 21 and the first circuit board 31 of the sensor 30. Moreover, it avoids the interference caused by the second connection element 24 and ensures the accuracy of signal transmission. Certainly, the present disclosure is not limited thereto and not redundantly described herein.

Figure 9:
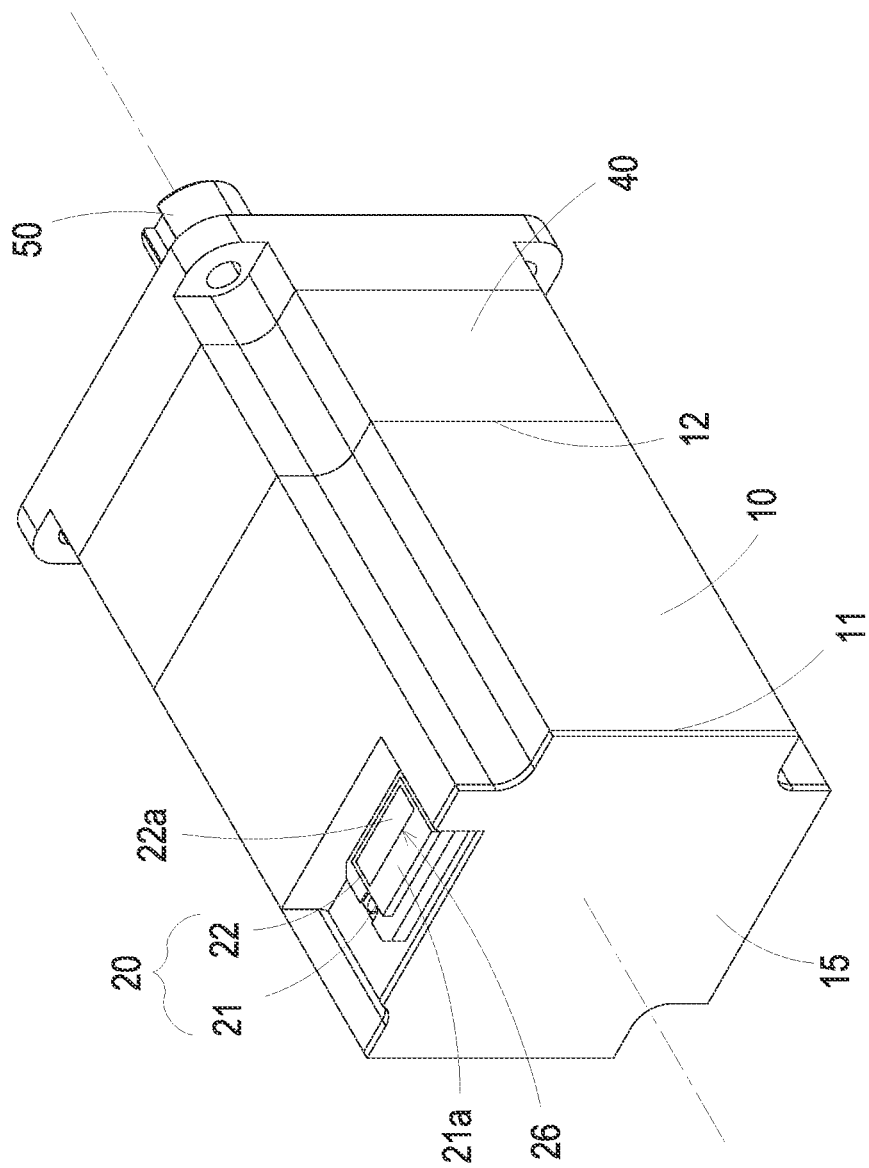
FIG. 9 shows a perspective view of the motor device according to the third embodiment of the present disclosure and taken from another perspective.
Figure 10:
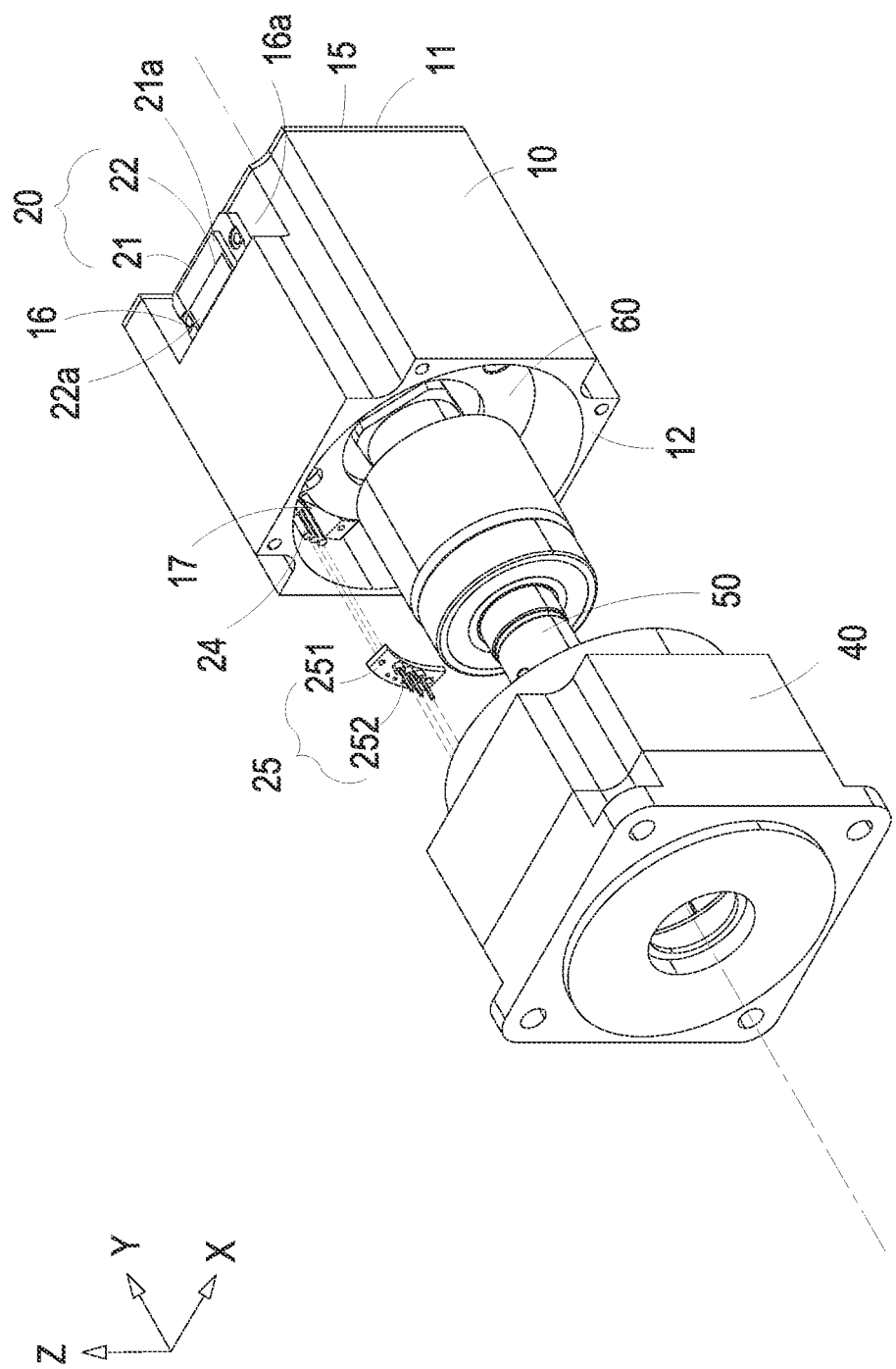
FIG. 10 shows a partially exploded view of the motor device according to the third embodiment of the present disclosure.
Figure 11:
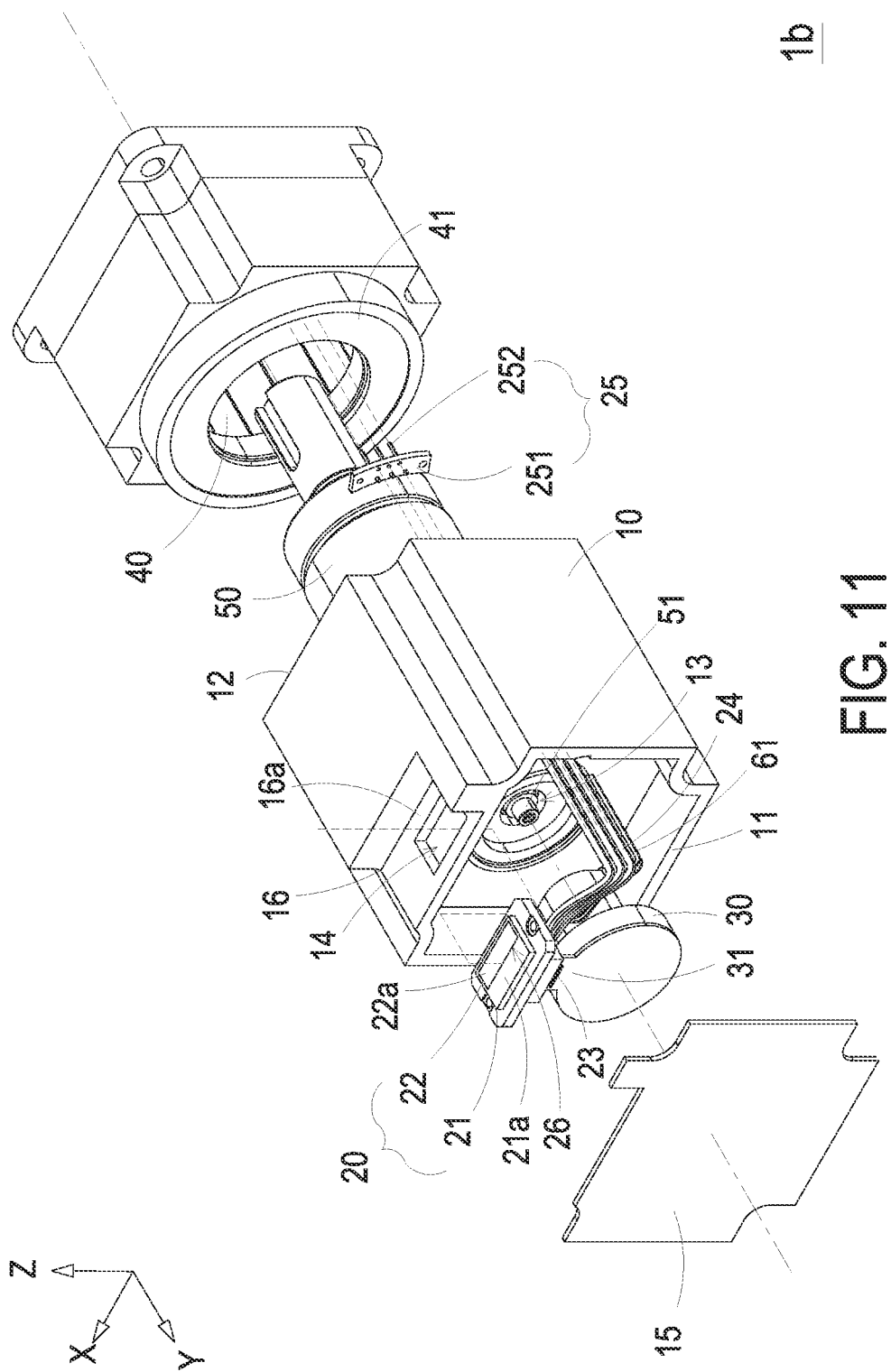
FIG. 11 shows an exploded view of the motor device according to the third embodiment of the present disclosure.
Figure 12:
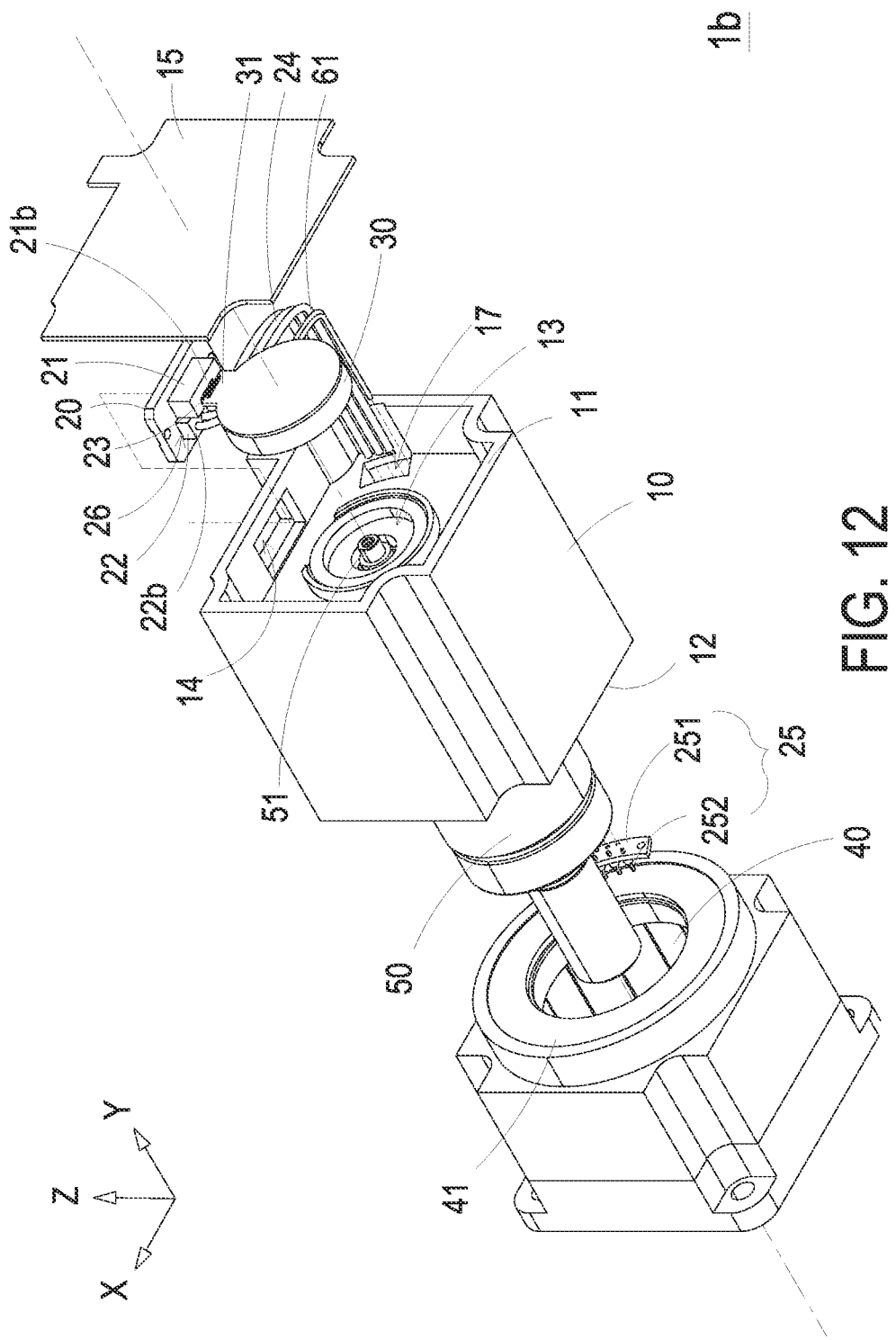
FIG. 12 shows an exploded view of the motor device according to the third embodiment of the present disclosure and taken from another perspective.
Figure 13:
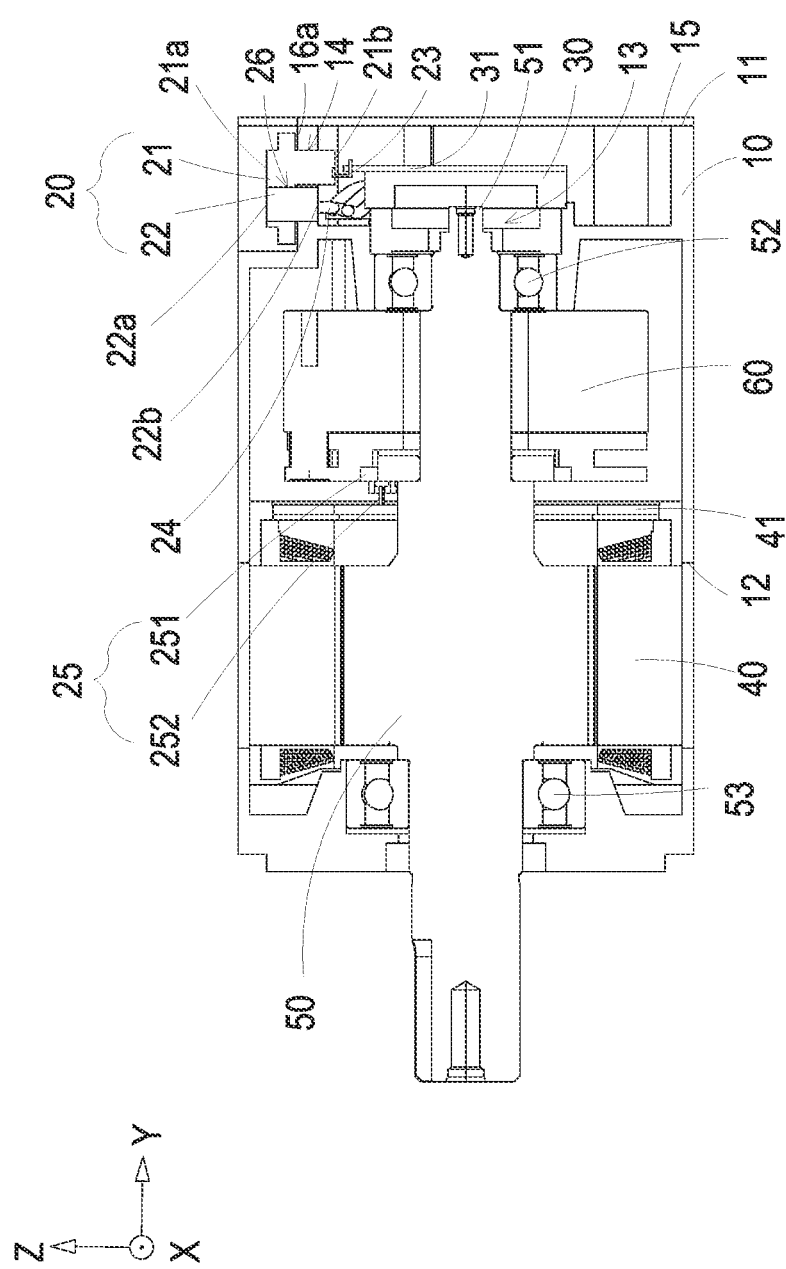
FIG. 13 shows a cross-sectional view of the motor device according to the first embodiment of the present disclosure.

FIGS. 8 and 9 show a perspective view of a motor device according to a third embodiment of the present disclosure. FIG. 10 shows a partially exploded view of the motor device according to the third embodiment of the present disclosure. FIGS. 11 and 12 show an exploded view of the motor device according to the third embodiment of the present disclosure. FIG. 13 shows a cross-sectional view of the motor device according to the first embodiment of the present disclosure. In the embodiment, the structures, elements and functions of the motor device 1b are similar to those of the motor device 1 in FIGS. 1 to 5. The elements and features indicated by the numerals similar to those of the first embodiment mean similar elements and features, and are not redundantly described herein. In the embodiment, the motor device 1b further includes a brake assembly 60 embedded in the bracket 10 and aligned with the communication aperture 13 of the bracket 10. Preferably but not exclusively, the brake assembly 60 and the first bearing 52 are embedded in the communication aperture 13 of the bracket 10. The end portion 51 of the rotor 50 passes through the brake assembly 60, the first bearing 52 and the communication aperture 13 of the bracket 10. Moreover, the end portion 51 of the rotor 50 spatially corresponds to the sensor 30. In the embodiment, the brake assembly 60 includes a third connection element 61 electrically connected to the second connector 22. Preferably but not exclusively, the third connection element 61 is a brake wire for conductive connection. When the third connection element 61 is connected to the second internal connection surface 22b of the second connector 22, the third connection element 61 and the first connection element 23 such as an L-shaped connection terminal are misaligned with each other and disjoint. The first connection element 23 connected to the first connector 21, and the second connection element 24 and the third connection element 61 connected to the second connector 22 are externally connected together through the connection assembly 40 to realize an integral external connection. Moreover, when the first connection element 23 served as the signal connection terminal is electrically connected to the first connector 21, the first connection element 23 is not interfered by the power wire and the brake wire connected to the second connector 22. It is beneficial to ensure the accuracy of signal transmission. Thus, the brake assembly 60 is embedded in the bracket 10 integrated with the connection assembly 20 to form a modular structure. It is beneficial to realize the automatic production of the motor device 1b and ensures the accuracy of signal transmission. The interference caused by the power wire and the brake wire is avoided. The present disclosure is not limited thereto and not redundantly described herein.

In summary, the present disclosure provides a motor device. By integrating the connection assembly with the bracket, at least two kinds of wires in the motor device are externally connected together through the connection assembly, and one single sealing component is used to achieve the sealing performance of the connection assembly and reduce the risk of sealing failure. On the other hand, the connection assembly having the at least two kinds of wires combined thereon is further integrated with the bracket to form a modular structure. It is beneficial to realize the automatic production of the motor device. Moreover, by using the bracket integrated with the connection assembly, a sensor, a rotor and a stator of the motor device are connected. For example, the connection assembly is formed by assembling a first connector and a second connector. The first connector is electrically connected to the sensor through a signal connection terminal, and the second connector is electrically connected to a circuit board of the stator through a power wire passing through the bracket. The signal connection terminal is formed between the first connector and the sensor, so that a shorter and stable structure is formed for an electrical connection. The power wire passing through the bracket is connected to the second connector, and the second connector is further inserted into an accommodation opening of the first connector to realize the external connection together. In this way, the signal connection terminal and the power wire of the motor device can be externally connected through the connection assembly. Moreover, when the signal connection terminal is electrically connected to the first connector, it is not interfered by the power wire connected to the second connector. It is beneficial to ensure the accuracy of signal transmission. In addition, the power wire passing through the bracket can be electrically connected to the circuit board of the stator through a terminal assembly to form a modular structure. It is beneficial to realize the automatic production of the motor device. In addition, by embedding a brake assembly in the bracket having the connection assembly integrated thereon, a modular structure is formed. It facilitates the motor device to achieve the automatic production and ensure the accuracy of signal transmission, which is not interfered by a brake wire.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A motor device comprising:
   a bracket, comprising a first end, a second end, a communication aperture and a slot, wherein the first end and the second end are opposite to each other, and the communication aperture passes through the first end and the second end, and the slot is disposed at the first end;
   a connection assembly, comprising a first connector and a second connector, wherein the first connector is disposed in the slot, and the first connector comprises an accommodation opening, and the second connector is inserted into the accommodation opening, wherein the first connector comprises a first connection element and the second connector comprises a second connection element;
   a sensor, disposed at the first end of the bracket, and comprising a first circuit board electrically connected to the first connector through the first connection element;
   a stator, connected to the second end of the bracket, wherein the stator comprises a second circuit board, the second connection element passes through the bracket, and the second circuit board is electrically connected to the second connector through the second connection element; and
   a rotor, passing through the stator, wherein an end portion of the rotor passes through the communication aperture of the bracket, and the end portion of the rotor spatially corresponds to the sensor, wherein the first connector comprises a first external connection surface and a first internal connection surface, and the first external connection surface and the first internal connection surface are opposite to each other, wherein the first external connection surface is exposed from the slot, and the first connection element is connected to the first circuit board from the first internal connection surface, wherein the second connector comprises a second external connection surface and a second internal connection surface, and the second external connection surface and the second internal connection surface are opposite to the each other, wherein the second external connection surface is a portion of the second connector exposed from the accommodation opening, and the second connection element is connected to the second circuit board from the second internal connection surface.

2. The motor device according to claim 1, further comprising a sealing component, wherein the sealing component spatially corresponds to the connection assembly and covers the connection assembly.

3. The motor device according to claim 1, wherein the first internal connection surface spatially corresponds to the first circuit board, and the first connection element is connected between the first internal connection surface and the first circuit board, and the first connection element and the second internal connection surface are misaligned with each other.

4. The motor device according to claim 1, wherein the second connection element is connected between the second internal connection surface and the second circuit board, and the second connection element and the first internal connection surface are misaligned with each other.

5. The motor device according to claim 1, wherein a distance between the first external connection surface and the first internal connection surface is greater than a distance between the second external connection surface and the second internal connection surface.

6. The motor device according to claim 1, wherein the first circuit board is disposed on a surface of the sensor and outwardly projected from the surface, wherein the first circuit board is extended toward the first connection element, wherein the first connection element is a connection terminal, wherein the connection terminal is an L-shaped connection terminal.

7. The motor device according to claim 1, wherein the first connection element is a signal connection terminal, and the second connection element is a power wire.

8. The motor device according to claim 1, wherein the bracket comprises a recessed portion located at the first end of the bracket and recessed inwardly from an outer peripheral edge of the bracket, wherein the slot is disposed on a bottom surface of the recessed portion.

9. The motor device according to claim 1, wherein the second connection element is a conductive wire passing through the bracket.

10. The motor device according to claim 1, wherein the bracket comprises a terminal assembly disposed at the second end, and the terminal assembly comprises a carrying board and at least one connection terminal, wherein the at least one connection terminal is disposed on the carrying board, and the carrying board is fixed at the second end, wherein the second connection element is electrically connected to the second circuit board of the stator through the at least one connection terminal.

11. The motor device according to claim 1, further comprising a brake assembly embedded in the bracket and aligned with the communication aperture of the bracket, wherein the brake assembly comprises a third connection element electrically connected to the second connector, wherein the end portion of the rotor passes through the brake assembly and the communication aperture of the bracket, wherein the end portion of the rotor spatially corresponds to the sensor.

12. The motor device according to claim 11, wherein the third connection element is a brake wire.

\* \* \* \* \*